Patented July 2, 1929.

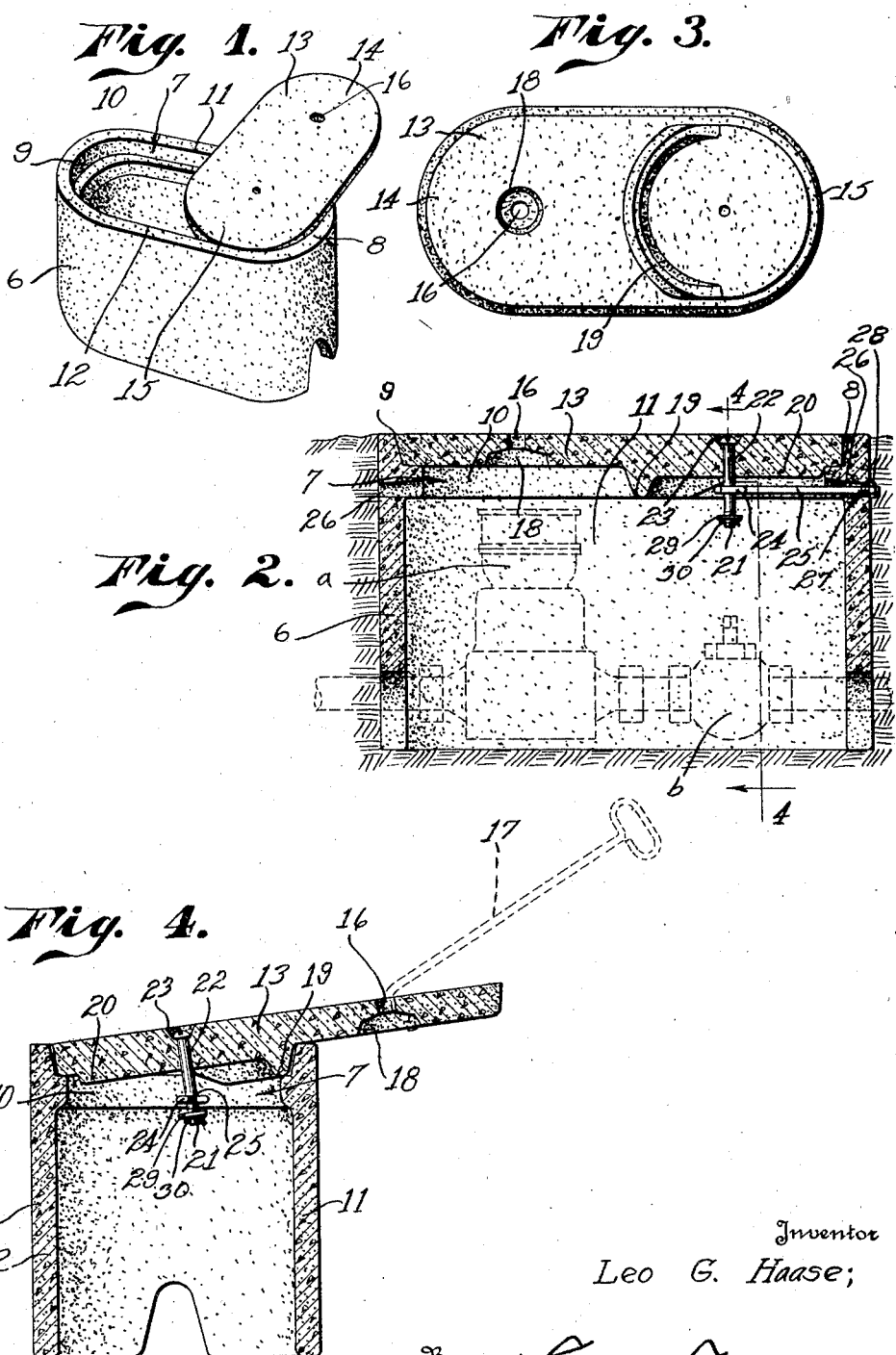

1,719,224

UNITED STATES PATENT OFFICE.

LEO G. HAASE, OF LONG BEACH, CALIFORNIA.

METER BOX.

Application filed September 26, 1927. Serial No. 221,958.

This invention relates to meter boxes and one of the principal objects of the invention is to facilitate opening and closing of the cover of the box so that a large number of meters can be read by the meter reader in a minimum time with an expenditure of a minimum amount of exertion in opening and closing the cover.

The salability of a meter box depends not only upon its simplicity of construction and low cost, but largely upon those features that make it possible for the meter reader to quickly open and close the cover with a minimum amount of exertion for, it will be readily understood that the quicker the cover can be opened and closed and the less exertion is made in performing this operation, the more meters the meter reader can read in a given time. Meter boxes were formerly constructed of wood, and some of them were constructed of iron, and many of the present meter boxes are of cement construction. The meter boxes are of relatively large size and, accordingly, when constructed of iron or cement the covers are quite heavy and it will be apparent that a construction that will admit of sliding or turning the cover will make the reading of the meters easier than if the construction is such that requires the covers to be raised or lifted out of the case. An object of this invention is to provide a construction which will permit of the cover being turned so as to expose the meter dial to view and to permit of the cover being entirely removed when it is desired to make repairs to the meter or to turn on or off the fluid that flows through the meter.

An important object of the invention is to provide a construction that will tend to retain one end of an elongate cover in position while the cover is being turned about said end.

An important object is to provide a loose connection between the cover and case that will permit of turning of the cover and, at the same time, will permit of total removal of the cover from the case, when that becomes desirable.

Other objects and advantages will appear in the subjoined detailed description.

The accompanying drawings will illustrate the invention:

Figure 1 is a perspective view of a meter box constructed in accordance with the provisions of this invention, the cover being shown turned into open position.

Figure 2 is a longitudinal mid-section of the meter box shown in Figure 1, the cover being in closed position. The meter and its connections are indicated by broken lines.

Figure 3 is a reduced inverted plan view of the cover.

Figure 4 is a vertical transverse section of the meter box, the cover being shown in open position and the plane of section being indicated in Figure 2 by the line 4—4. A tool for use in opening and closing the cover is indicated in broken lines connected to the cover.

Referring to the drawings, the meter box comprises a case 6 of suitable height and length to properly house the meter $a$ and valve $b$. The case 6 has in its top an elongate opening 7. At least one end wall 8 of the opening 7 is approximately semi-circular and, in this instance, the other end wall 9 is also semi-circular. The case is provided a short distance below the top thereof with an inwardly projecting ledge 10. The ledge 10 is preferably wider adjacent the end walls 8, 9 than along the side walls 11, 12 of the case. In this instance, the side walls 11, 12 are straight and substantially parallel.

Adapted to fit the opening 7 is a cover 13 and, since the end walls 8, 9 are semi-circular, the ends of the cover are also semi-circular as indicated at 14, 15. The cover 13 is adapted to seat on the ledge 10 and, preferably, the edge of the cover is downwardly and inwardly bevelled. The walls of the opening 7 are also downwardly and inwardly bevelled. Preferably, one end of the cover 13 is bevelled to a slighter degree than the other end and the longitudinal edges so that, when the other end of the cover is raised and turned to bring the cover into the open position shown in Figures 1 and 4, the upper corner of the cover which lies adjacent to the wall of the opening 7 will not bear against the said wall and force the cover inwardly on the ledge 10. If this occurred there would be a tendency for that end of the cover that rides on the ledge to tip downwardly and permit the cover to fall into the case.

It is preferable to provide a vertically extending hole 16 in the cover 13 to permit of the insertion of the hook shaped end of a tool of the type, for example, indicated at 17, said tool facilitating raising of one end of the cover and turning of the cover into open and closed positions. Preferably the hole 16 is counter-bored at its lower end, as indicated at 18, so as to reduce the thickness of the cover at that point and permit of entrance of the hook shaped end of the tool 17.

The cover is provided on its under face with a downwardly projecting curved flange 19 adapted, when the cover is raised at one end and turned about its curved end, to engage the adjacent end wall 8 of the opening 7, thus holding that portion of the cover, around which the cover turns, against sliding off of the ledge 10 and falling into the case. In this instance, the flange 19 is semi-circular and the outer face thereof is complementary to the semi-circular wall 8.

In operating the cover into the open and closed positions, it is of advantage to have the cover weighted at the end about which the cover turns and, in this instance, the weighting is secured by providing a downwardly projecting circular thickened portion 20. The diameter of the thickened portion 20 is approximately twice as great as the radius of the semi-circular end wall of the opening, and the edge of said thickened portion, in this instance is downwardly and inwardly bevelled. A portion of the thickened portion 20 constitutes the base portion of the flange 19 and the outer face of the flange 19 is also downwardly and inwardly bevelled to agree with the bevelling of the thickened portion 20.

It may be desirable, in some instances, to loosely connect the cover to the case so that the cover cannot be misplaced or lost or raised and then allowed to fall. If the cover were raised and then allowed to fall it would be apt to be broken. In this particular instance the means for loosely connecting the cover to the case pivotally connects said cover to the case and is constructed as follows:

Projecting downwardly from the cover 13, between the flange 19 and the adjacent end of said cover, is a stud 21 that constitutes a pivot and that may be formed by inserting a stove bolt in a vertical hole 22 in the cover. The upper end of the hole 22 is preferably counter-bored, as indicated at 23, so that the head of the bolt will not project above the upper face of the cover. A bearing 24 is provided for the stud 21, said bearing, in this instance, being formed at the inner end of an arm 25 that projects through one of the horizontal holes 26 with which the opposite ends of the case are provided. The bearing 24 is of a diameter sufficient to permit of tilting therein of the stud 21 so that the cover may be turned without raising it at the pivoted end. The outer end of the arm 25 is provided with screw threads 27 to receive a nut 28 which prevents the arm 25 becoming detached from the casing. The reason for providing holes 26 at opposite ends of the case is that, in installing the case in the earth, if the workmen make a mistake and place the case so that when the cover is opened the dial of the meter is beneath the end of the cover about which the cover turns, said cover can be detached from the case and turned end for end and then pivotally attached to the case in the new position.

In operation, to open the cover, the tool 17 or its equivalent will be attached to the cover by inserting it in the hole 16 and said tool will then be pulled upwardly to raise one end of the cover and said tool will then be pulled laterally so as to swing the cover about the axis of the pivot 21 into the open position shown in Figures 1 and 4. To close the cover, the operations just described will be performed in a reverse order.

From the foregoing it will be seen that, in opening the cover, it is only necessary to raise a weight equivalent to about one half of the weight of the cover and that, as soon as the cover has been turned sufficiently to engage the under face thereof with the top edge of the case, the remainder of the opening movement is secured by simply rotating the cover while it rests, partly upon the upper edge of the case and partly upon the ledge 10. It should be understood that the pivotal connection between the cover and case is not absolutely necessary and that the same may be omitted within the scope of the invention as expressed in some of the accompanying claims.

If desired, on the stud 21 may be placed a washer 29 which is held in place by a cotter pin 30 extending through the stud 21, so as to prevent the cover from being raised sufficiently to disengage the stud from the bearing 24. When it is desired to entirely remove the cover for repairs to the meter, installation of a new meter, or turning on or shutting off the fluid that is measured by the meter, either the nut 28 may be removed and the cover slid sufficiently to withdraw the arm 25 from the hole 26, or the cotter pin 30 and washer 29 may be removed from the stud 21 to permit the cover being raised to withdraw the stud from the bearing.

I claim:

1. A meter box comprising a case having an elongate opening in its top, an end wall of said opening being approximately semi-circular, the case provided with an inwardly projecting ledge, and a cover fitting the opening and seating on the ledge, the cover provided with a downwardly projecting curved flange complementary to the semi-circular end wall and adapted when the cover is raised at one end and turned about its curved flange to engage the adjacent end wall of the opening.

2. A meter box comprising a case having an elongate opening in its top, an end wall of said opening being approximately semi-circular, the case provided with an inwardly projecting ledge, and a cover fitting the opening and seating on the ledge, the cover provided with a downwardly projecting approximately semi-circular flange complementary to the semi-circular end wall and adapted when the cover is raised at one end and turned about its semi-circular flange to engage the adjacent end wall of the opening.

3. A meter box comprising a case having an elongate opening in its top, an end wall of said opening being approximately semi-circular, the case provided with an inwardly projecting ledge, and a cover having a semi-circular end fitting the opening and seating on the ledge, the cover provided at its semi-circular end with a downwardly projecting approximately circular thickened portion of a diameter approximately twice as great as the radius of the semi-circular end wall of the opening.

4. A meter box comprising a case having an elongate opening in its top, an end wall of said opening being approximately semi-circular, the case provided with an inwardly projecting ledge, a cover provided with a downwardly projecting curved flange complementary to the semi-circular end wall and fitting the opening and seating on the ledge and adapted to be raised at one end and turned on the ledge about its curved flange, and a means loosely connecting the cover to the case.

5. A meter box comprising a case having an elongate opening in its top, an end wall of said opening being approximately semi-circular, the case provided with an inwardly projecting ledge, a cover provided with a downwardly projecting curved flange complementary to the semi-circular end wall and fitting the opening and seating on the ledge and adapted to be raised at one end and turned on the ledge about its curved flange, and a means pivotally connecting the cover to the case.

6. A meter box comprising a case having an elongate opening in its top, an end wall of said opening being approximately semi-circular, the case provided with an inwardly projecting ledge, and a cover provided with a downwardly projecting curved flange complementary to the semi-circular end wall and fitting the opening and seating on the ledge and adapted to be raised at one end and turned on the ledge about its curved flange, said cover being of greater weight at its flanged end.

7. A meter box comprising a case having an elongate opening in its top, an end wall of said opening being approximately semi-circular, the case provided with an inwardly projecting ledge, a cover fitting the opening and seating on the ledge, the cover provided with a downwardly projecting approximately semi-circular flange, and with a stud, a bearing for the stud secured to the case, the bearing being of a diameter sufficient to permit of tilting therein of the stud so that the cover may be turned without raising it at the pivoted end.

Signed at Los Angeles, Calif., this 13 day of September, 1927.

LEO G. HAASE.